(12) United States Patent
Talesky

(10) Patent No.: US 6,182,935 B1
(45) Date of Patent: Feb. 6, 2001

(54) FOLDING TABLE FOR USE WITH A TABLE SAW

(75) Inventor: Mark S. Talesky, Chicago, IL (US)

(73) Assignee: S-B Power Tool Company, Chicago, IL (US)

(*) Notice: Under 35 U.S.C. 154(b), the term of this patent shall be extended for 0 days.

(21) Appl. No.: 09/329,035

(22) Filed: Jun. 9, 1999

(51) Int. Cl.[7] .............................. A47B 3/02; F16M 11/38
(52) U.S. Cl. .......................... 248/436; 248/432; 108/118; 108/120
(58) Field of Search ..................... 248/436, 439, 248/166, 188.6, 277.1, 286.1, 432, 434, 440; 108/118, 120, 132; 297/42, 43; 269/289 R

(56) References Cited

U.S. PATENT DOCUMENTS

| | | | |
|---|---|---|---|
| 1,234,569 | 7/1917 | Rehfuss | 108/99 |
| 1,895,290 | * 1/1933 | Lobel | 108/120 |
| 1,982,205 | 11/1934 | Doman | 68/10 |
| 2,557,594 | 6/1951 | Bryan | 311/83 |
| 2,624,469 | 1/1953 | Cadwell et al. | 211/147 |
| 2,908,984 | 10/1959 | Lantz | 38/121 |
| 2,968,059 | 1/1961 | Munson | 16/172 |
| 3,152,833 | 10/1964 | Creveling et al. | 297/140 |
| 5,199,930 | * 4/1993 | Weber | 248/439 |
| 5,542,639 | 8/1996 | Wixey et al. | 248/439 |

FOREIGN PATENT DOCUMENTS

| | | | |
|---|---|---|---|
| 155398 | * 9/1932 | (CH) | 108/132 |
| 576848 | * 8/1924 | (FR) | 248/432 |
| 6933 | * of 1904 | (GB) | 108/120 |
| 340901 | * 1/1931 | (GB) | 108/120 |
| 451729 | * 9/1949 | (IT) | 108/120 |
| 81565 | * 12/1955 | (NL) | 108/120 |

* cited by examiner

Primary Examiner—Ramon O. Ramirez
Assistant Examiner—Jon Szumny
(74) Attorney, Agent, or Firm—Gardner Carton & Douglas

(57) ABSTRACT

A folding table for use with a table saw. The folding table including an upper support surface to hold the table saw and a leg mechanism slidably connecting to the upper support surface through slots in the sides of the upper support surface. An actuator plate is provided to lock the leg mechanism in an open position whereby the legs support the upper support surface and a closed position whereby the leg mechanism is compact and fits closely with the upper support section. The actuator plate moves between a locked position, whereby the leg mechanism is secured in the open or closed position by pins in a curved lateral slot or straight lateral slot in the actuator plate, respectively, and a released position where the pins move between the curved and the straight slots. Indicator tabs can also be provided to show if the actuator plate is in the locked or released position.

17 Claims, 6 Drawing Sheets

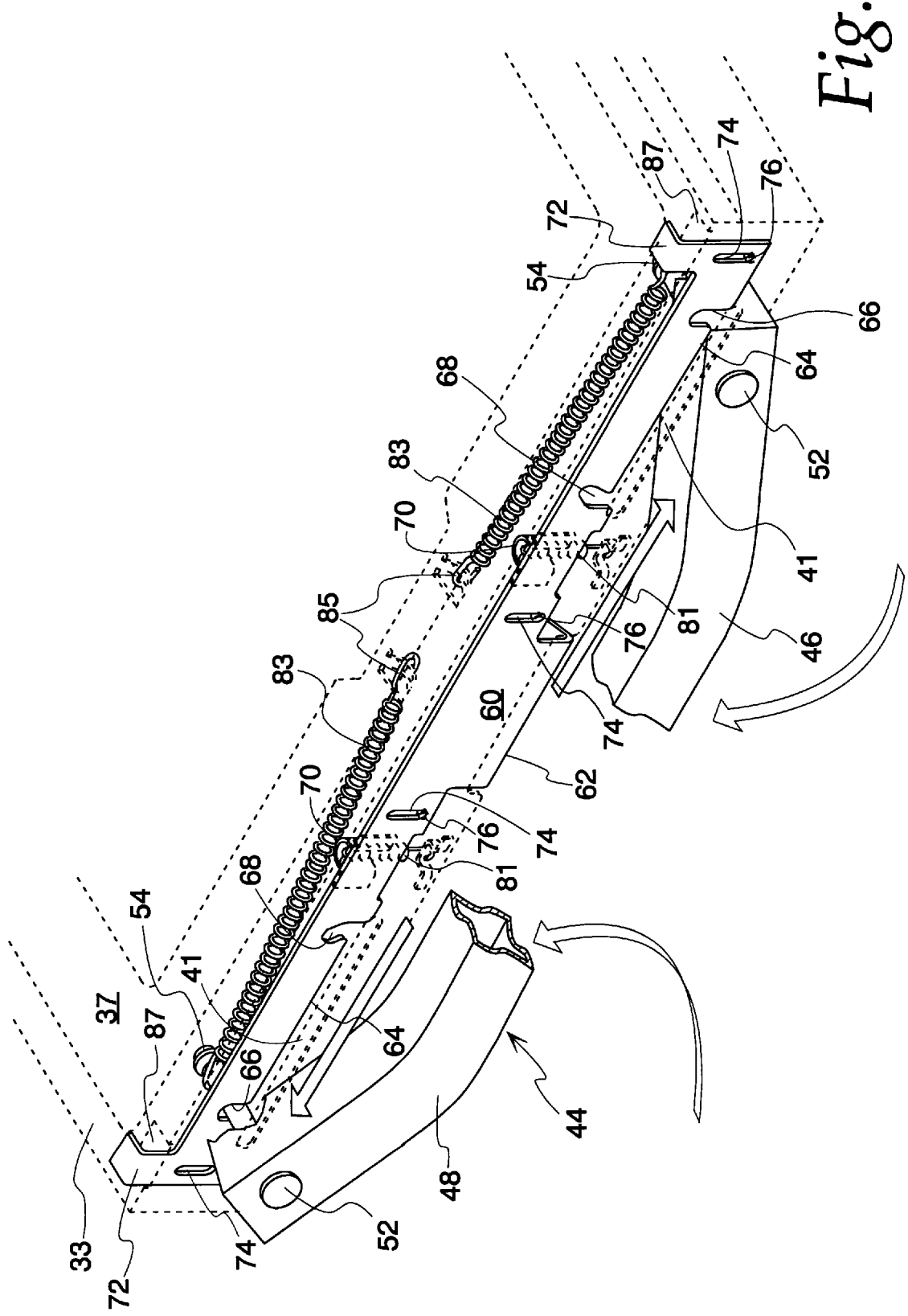

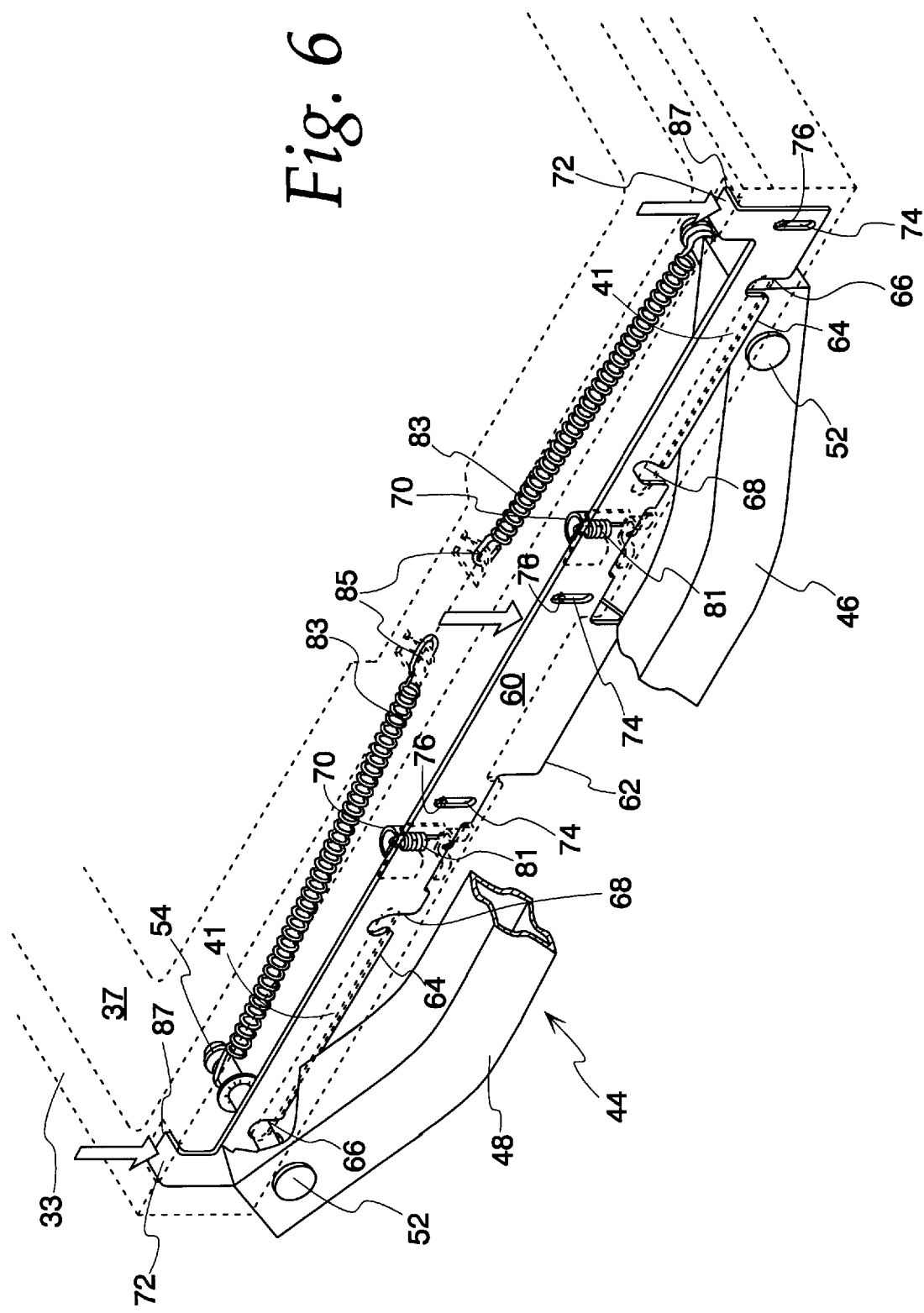

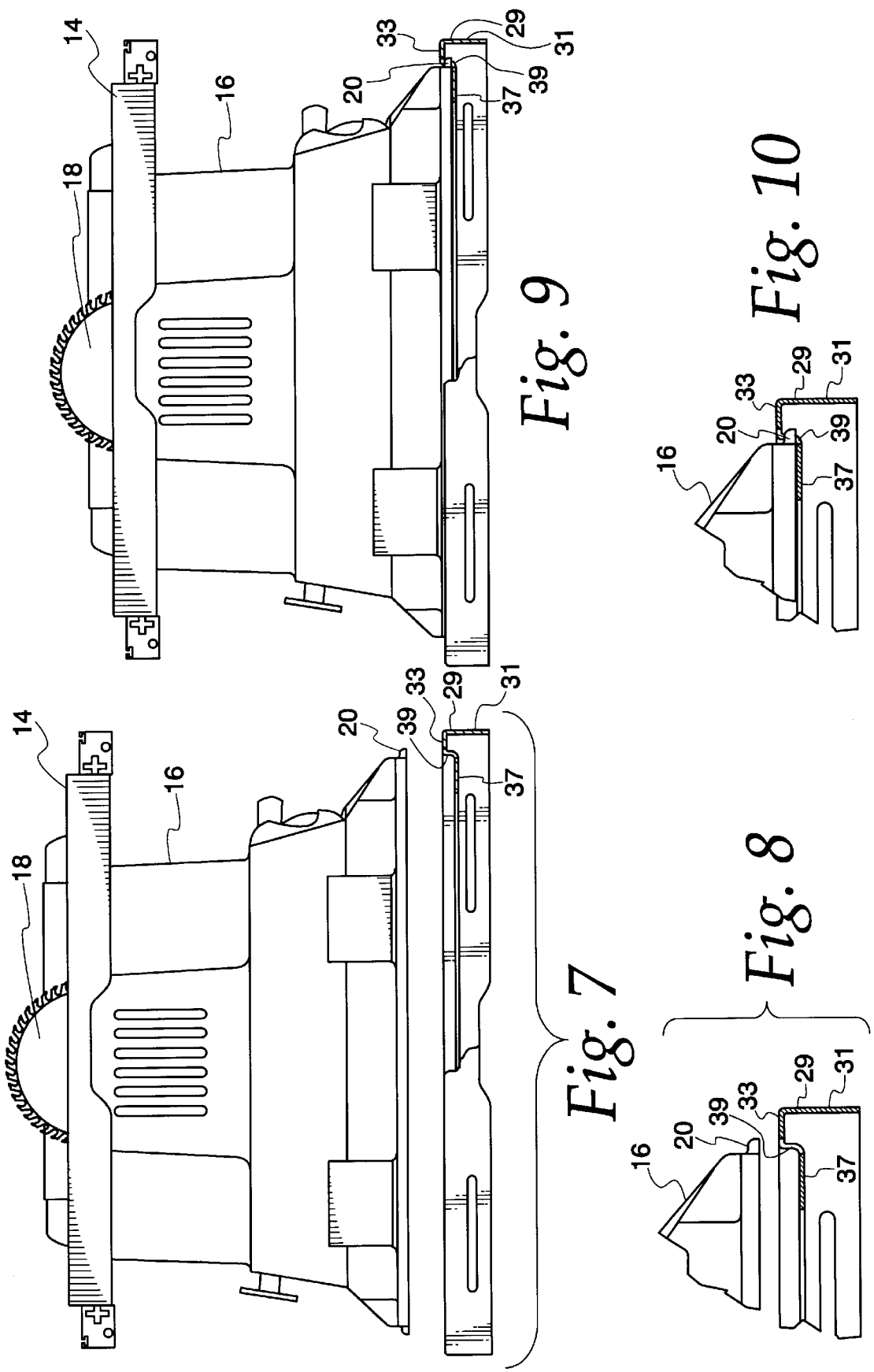

FOLDING TABLE FOR USE WITH A TABLE SAW

BACKGROUND OF THE INVENTION

1. Field of the Invention

The present invention relates to a folding table, and, in particular, to a folding table for use with a table saw.

2. Scope of the Prior Art

Tables and other support surfaces have long been used with folding or detachable legs. The reasons for developing such support surfaces are varied and include making it easier to transport and store the table. Traditionally, folding tables include an upper support surface and legs that are either detachable or can fold in some arrangement. Different designs are readily available and are used for folding card tables and folding ironing boards. In addition, various designs exist where the table is used to hold heavier items, such as table saws.

For folding card tables, each leg is pivotally connected at one end to the underside of the table, or support, surface. The legs are connected such that each leg pivots in a different direction so that all the legs fit compactly underneath the table surface.

Ironing boards typically have two legs where at least one leg is pivotally connected to the underside of the ironing surface. The other leg is slidably connected in a channel that is provided on the underside of the table. The two legs are also pivotally connected together at their midpoint. In operation, the sliding leg moves through the channel so that other leg pivots about its pivot point. In this way, the legs can move between a closed position, where the legs rest underneath the ironing surface, and an open position, where the legs are extended into a supporting position that supports the table at a desired height. A release and lock mechanism is often provided between the channel and sliding leg to secure the legs in a selected open position.

Folding tables of various designs have also used the sliding leg arrangement of the type used by ironing boards. One such table is disclosed in U.S. Pat. No. 3,152,833 to Creveling et al. for Folding Table and Chair Combination. Creveling discloses a table surface that has four bracket channels attached to the underside of the table surface. The table also has two leg set pairs that are pivotally connected at the midpoints. The upper end of each leg is connected to a leg on the corresponding leg set pair by a rod. The rods are slidably connected through the bracket channels. In addition, a frame extends between the underside of the table surface and the pivotally connected midpoints of the leg pairs. A mechanism is provided with the frame to lock the legs in a selected position. Extension springs are provided between the upper end of the legs and the frame to assist the legs as they are moved from a lowered position to an elevated position.

The tables discussed above are not necessarily designed to hold heavy loads, such as table saws, although these tables can be adapted to hold such devices if they are constructed with the correct materials. Those materials, however, may make it difficult for a user to move and store the tables when necessary. Folding tables that are used for table saws are typically used at construction sites, and must be able to be transported between many different locations. As one can appreciate, a portable table saw, while designed to be easy to transport, is quite heavy. In addition, the user has to move many other pieces of heavy equipment and work materials. It is, therefore, desirable for a folding table to be designed that is easy to transport, that is lightweight, yet is designed to hold the table saw and withstand the operations for which a table saw is used.

Most portable table saws have a specifically designed folding table for that particular model of table saw. One such table includes an upper support surface that only comprises the outer perimeter of the upper surface to thereby reduce the weight of the table. Extending from the outer edge of the upper surface, the table includes a side edge. Arcuate slots are provided in one set of opposing edges. The table is provided with two-leg set pairs where the legs in each pair are pivotally connected to one another about their midpoints. One leg of each pair is pivotally connected to the opposing side edges and the other leg is slidably connected on the opposing side edges through the arcuate slot. In the closed position, the sliding leg is positioned in the slot proximate the pivoting leg and the upper support surface is rotated about the legs so that the legs are folded underneath the support surface. In the open position, the sliding leg is positioned in the distal end of the slot to support the upper support surface. To move the table from the closed position, the support surface is lifted from the legs and the sliding leg is moved through the arcuate slot as the legs pivot about their pivot point. Because of the arcuate slot, the table is secured to support the table saw and withstand the pressures exerted on it during operation of the saw. In operation, it can be difficult to move the sliding leg through the arcuate slot and the support surface is not secured in the closed surface. In addition, a locking mechanism is not provided to secure the upper support surface in the closed position. The folding table can therefore be difficult to transport while in the closed position.

It is therefore necessary to design a folding table for use with a table saw that is strong enough to support a table saw and that overcomes the problems of the prior art.

SUMMARY OF THE INVENTION

The present invention is a folding table that is particularly designed to support a portable table saw. The table includes an upper support surface that has sides extending from the edge of the support surface. One set of opposing sides include two elongated slots that are positioned between the end of the sides and the center. The support surface can have a hole in the center extending towards the outer edge to reduce the weight of the table. In addition, the upper support surface can include slots through which a portion of the table saw can fit to secure the table saw to the folding table. The upper surface may also include indicator portions that are located proximate the corners of the table.

The table is supported by two sets of leg pairs. Each leg has a curved upper end and is connected to the other leg in the pair by a pin so that the legs can pivot about the pin. The legs are connected to the support surface at the curved upper end by sliding leg pins that fit through the longitudinal slots in the sides. The pins are sized so that that they readily slide through the longitudinal slots.

The table also includes two actuator plates to secure the legs in a locked closed position and a locked open position. The actuator plates include a set of straight slots toward the end of the plate that laterally extend from one longitudinal edge toward the opposing edge. The actuator plates also include a set of curved slots towards the center of the plate that laterally extend from the one longitudinal edge towards the opposite end. On the opposing longitudinal edge, the plate can include an indicator tab that extends above the edge. Between the curved slots, a comfort handle is provided on the first longitudinal edge. Lateral guiding slots are also provided between the end of the actuator plate and the straight slots and between the handle and the curved slots. The actuator plate is connected to the sides of the table surface by shoulder screws that slide through the lateral guiding slots.

In operation, the actuator plate moves between a locked position and a released position. In the locked position, the leg pins are secured in the straight slots or the curved slots. In the straight slots, the legs are in the closed and collapsed position, and in the curved slot, the legs are in the open and extended position. In a released position, the sliding leg pins are removed from the straight or curved slots and can slide through the elongated slot in the side between the slots. In order to release the pins from the curved slot, the table should be lifted. The comfort handle is provided to make it easier to move the actuator plate.

The table can include two sets of extension springs to assist in the operation of the folding table. A first set of extension springs is connected between the support surface and the actuator plate to bias the actuator plate in the closed position. The second set of extension springs is connected between the support surface and the legs to bias the legs in the open position.

An alternative embodiment of the invention includes the indicator portion, which is an indent on the support surface, and the indicator tabs on the actuator plate. When the actuator plate is in the locked position, the indicator tab is positioned within the indicator portion so that the tab is flush with the upper support surface. If an indicator tab is not flush with the upper support surface, the user knows that the corresponding leg is not locked.

These and numerous other features and advantages of the present invention will become readily apparent from the following description, the accompanying drawings and the appended claims.

BRIEF DESCRIPTION OF THE DRAWINGS

FIG. 5 illustrates the actuator plate and folding leg pair where the actuator plate is in the released position and the folding leg pair is in the closed position;

FIG. 6 illustrates the actuator plate and folding leg pair of the present invention where the actuator plate is in the locked position and the folding leg pair is in the closed position;

FIG. 7 illustrates a side view of a table saw removed from the folding table;

FIG. 8 illustrates an exploded view of the table saw's tab removed from the slot in the folding table as shown in FIG. 7;

FIG. 9 illustrates a side view of the table saw positioned on the folding table, and FIG. 10 illustrates an exploded view of the table saw's tab inserted into the slot in the folding table as shown in FIG. 9.

DETAILED DESCRIPTION OF THE PREFERRED EMBODIMENT

Figure 1:
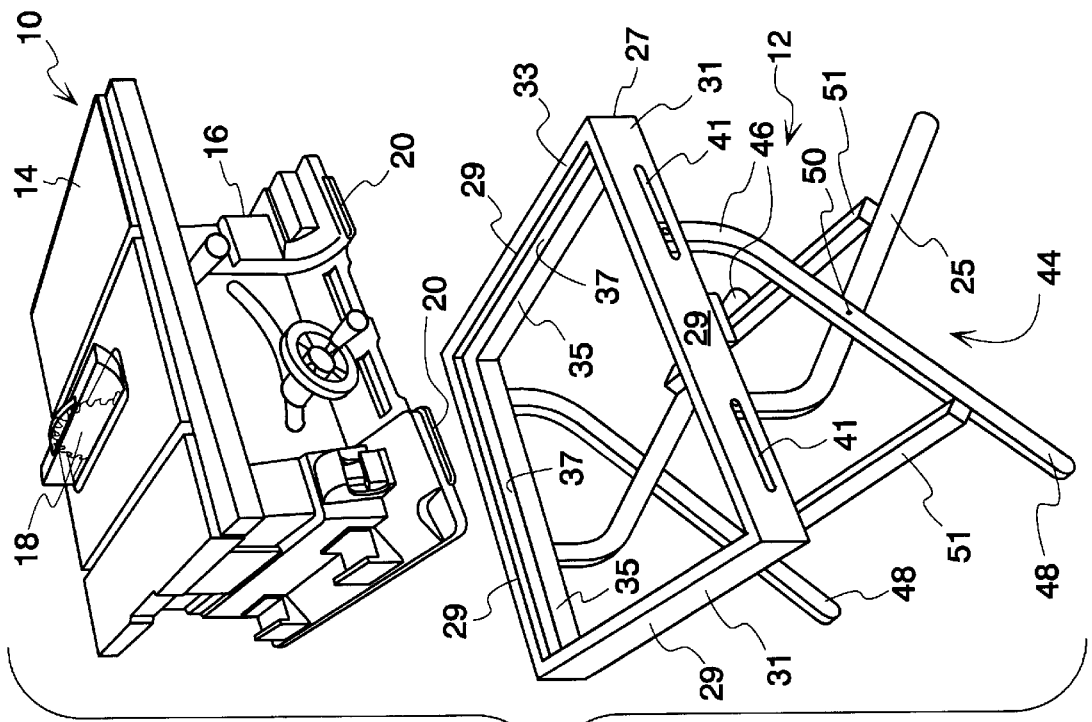
FIG. 1 illustrates a table saw on top of a folding table surface made in accordance with the principles of the present invention.
Figure 2:
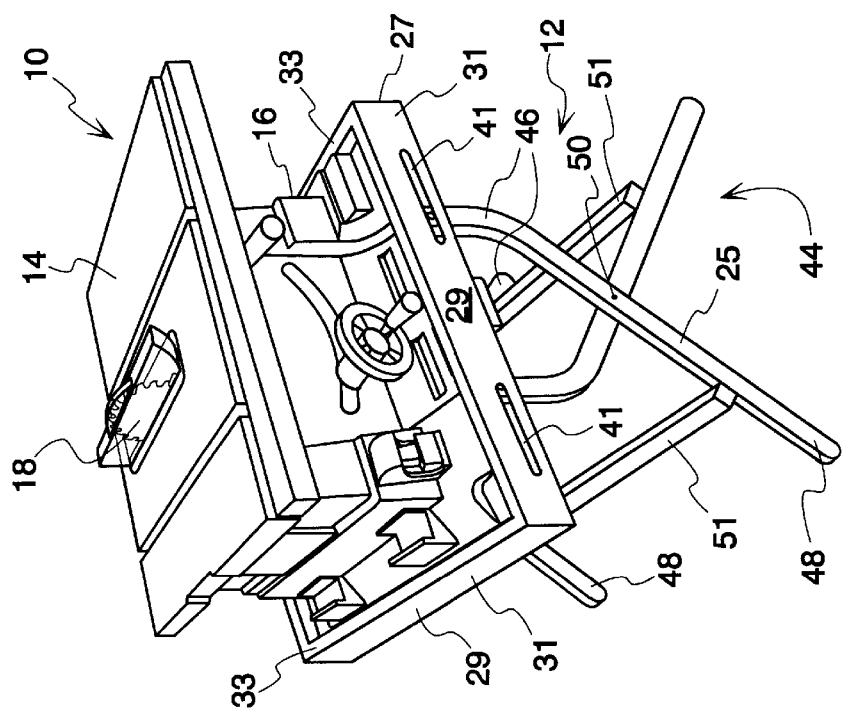
FIG. 2 illustrates a table saw and folding table surface where the table saw is removed from the table folding surface.

In FIG. 1, a table saw 10 and folding table 12 made in accordance with the principles of the present invention are shown where the table saw 10 is situated on top of the folding table 12. In FIG. 2, the table saw 10 is shown when it is removed from the folding table 12. The folding table 12 of the present invention is designed for use with portable table saws that are currently available. It will be understood by those skilled in the art that the type of folding table described can be used for any type of table saw as well as for other devices.

The table saw 10 shown in FIGS. 1 and 2 has many of the features of most table saws including a cutting surface 14 that is on top of a frame 16. A blade 18, which cuts substances such as wood, extends through an opening in the cutting surface 14. The frame 16 includes a set of tabs 20 that extend out from the bottom outer edge. As seen in FIG. 2, the tabs extend out only from one side of the frame 16. As will be described in more detail below and seen in FIGS. 7–10, the tabs 20 can be used to secure the table saw 10 to the folding table 12.

Referring to FIGS. 1–6, the folding table 12 includes a leg mechanism 25 that is slidably connected to an upper supporting section 27. The upper supporting section 27 is designed to hold the frame 16 so that the folding table surface 12 supports the table saw 10. In the embodiment shown in FIGS. 1 and 2, the upper supporting section 27 has a generally square shape which is defined by four sides 29. Each side includes an outer edge 31, an upper edge 33, and an inner edge 35. The upper edge 33 is generally perpendicular to the outer edge 31 and the inner edge 35.

The inner edge 35 includes a shelf section 37 between the inner edge's upper end and lower end. The shelf section 37 is generally parallel to the upper edge 33. As shown in FIG. 2, the shelf section 37 of each side 29 connect to form a surface that extends around the perimeter of the table. When the table saw 10 is supported by the folding table 12, the table saw 10 is placed on surface formed by the shelf sections 37. The size of the shelf area formed by the sides is designed to correspond to the outer dimensions of the frame's lower edge. The table saw 10 then fits securely and is properly supported by the folding table surface 12. The upper support section can replace the shelf area with a solid surface between the sides. As shown in the Figures, however, it is preferred to have the described configuration to reduce the weight of the folding table surface 12.

Referring to FIGS. 7–10, on at least one of the sides 29, inner slots 39 are formed on the inner edge 35 between its upper end and the shelf section 37. Inner slots 39 are positioned on the inner edge to correspond to the location of tabs 20 on the frame 16. In addition, the inner slots 39 are slightly longer than the tabs 20 so that the tabs can fit easily into the inner slots. The upper support section 27 can be configured with inner slots 39 on each side 29 so that the table saw 10 can be oriented in any appropriate direction on the folding table surface 12.

Referring back to FIGS. 1–6, on two opposing sides 29, outer slots 41 are arranged laterally on the outer edges 31. An outer slot 41 is configured into each half of an opposing side 29. As will be understood, the length of each outer slot is great enough for the leg mechanism 25 to slide through the outer slots 41 between an open position and a closed position. In the open position, the leg mechanism 25 supports the table saw at a suitable height for operation. In the closed position, the leg mechanism 25 is compact and fits closely with the upper support section 27 so that the folding table 12 can be easily transported.

The leg mechanism 25 includes two leg pair sections 44. Each leg pair section 44 is made up of two legs 46, 48 The legs 46, 48 have a slight inverted J-shape with a straight lower end and a curved end towards the upper end. The shape of the legs 46, 48 are designed to adequately support the table saw 10 on the folding table surface 12 when the leg mechanism is in the open position. In addition, the legs' shape is designed so that the legs 46, 48 can fold, or slide, between the open and closed position. The legs 46, 48 can be connected by a pin 50, or bolt or other suitable mechanism so that the legs are pivotally connected together at a point between the upper and lower ends of the legs 46, 48. As seen in FIGS. 1 and 2, the leg pair sections 44 are connected by braces 51 between the respective legs 46 and 48 of each section 44.

The legs 46, 48 can be made of any suitable material and are preferably made of steel. In the preferred embodiment, the components of the leg mechanisms 25 have a square cross-section and are hollow. That configuration provides the necessary strength for the folding table 12 to support the weight of the table saw 10 while minimizing the weight of the folding table 12.

As seen in FIGS. 3–6, the legs 46, 48 are connected to the upper support section 27 by sliding leg pins 52. Sliding pins extend through holes (not shown) which are proximate the upper end of the legs 46 and 48 and through the outer slots 41. As can be appreciated by one skilled in the art, sliding pins 52 are secured in the hole and slots 41 by washers 54 or other suitable means. The leg pins 52 are sized so that they easily slide through the span of outer slots 41.

FIGS. 3–6 also illustrate an elongated actuator plate 60 that is used by the present invention. The actuator plate 60 is positioned proximate the outer edge 31 of the upper support section 27 and is used to secure the leg mechanism 25 in the open and closed position, as will be described in more detail below. Centered on its lower edge, the actuator plate 60 includes a comfort formed handle portion 62. The cross-section of the handle 62 has a general L-shape where the foot of the handle 62 extends under the upper support section 27.

Figure 4:
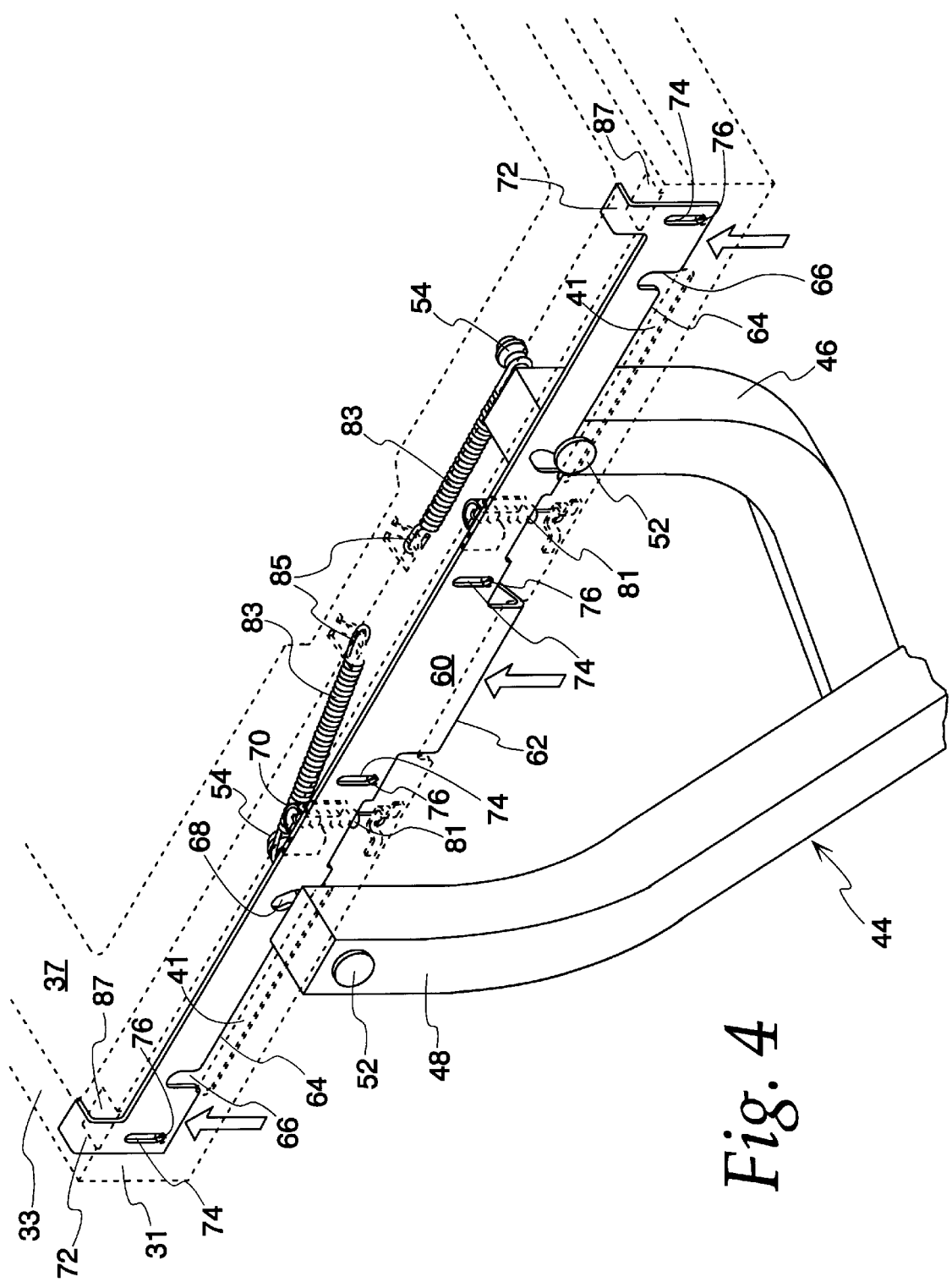
FIG. 4 illustrates the actuator plate and folding leg pair where the actuator plate is in the released position and the folding leg pair is between the open and closed position.

On the lower edge of the actuator plate 60, an indented portion 64 is positioned between the handle portion 62 and each end of the actuator plate 60. The end of the indented portion 64 proximate the end of the actuator plate include straight slots 66 that extend laterally across the plate. As seen in FIGS. 4–6, the opposing end of the indented portion 64 proximate the handle 62 has laterally extending curved slots 68. The lower ends of straight slots 66 and curved slots 68 open into the indented portion. On the rear side of the actuator slot, brackets 70 can be configured. In the preferred embodiment, the actuator plate includes L-shaped indicator tabs 72. The indicator tabs 72 extend from the upper edge of the actuator plate 60.

The actuator plate can also include a series of lateral guiding slots 74 that are used in connecting the actuator plate 60 to the upper support section 27. As shown, shoulder screws 76 are used to connect the actuator plate 60 to the upper support section. The shoulder screws 76 are sized to slidably pass through the lateral guiding slots 74 and are secured to the outer edge 31 of the upper support section 27. The lateral guiding slots 74 and the shoulder screws 76 permit the actuator plate to move between a locked position and a released position. In the locked position, the upper end of the securing slot can rest on the shoulder screw to support the actuator plate 60.

Figure 3:
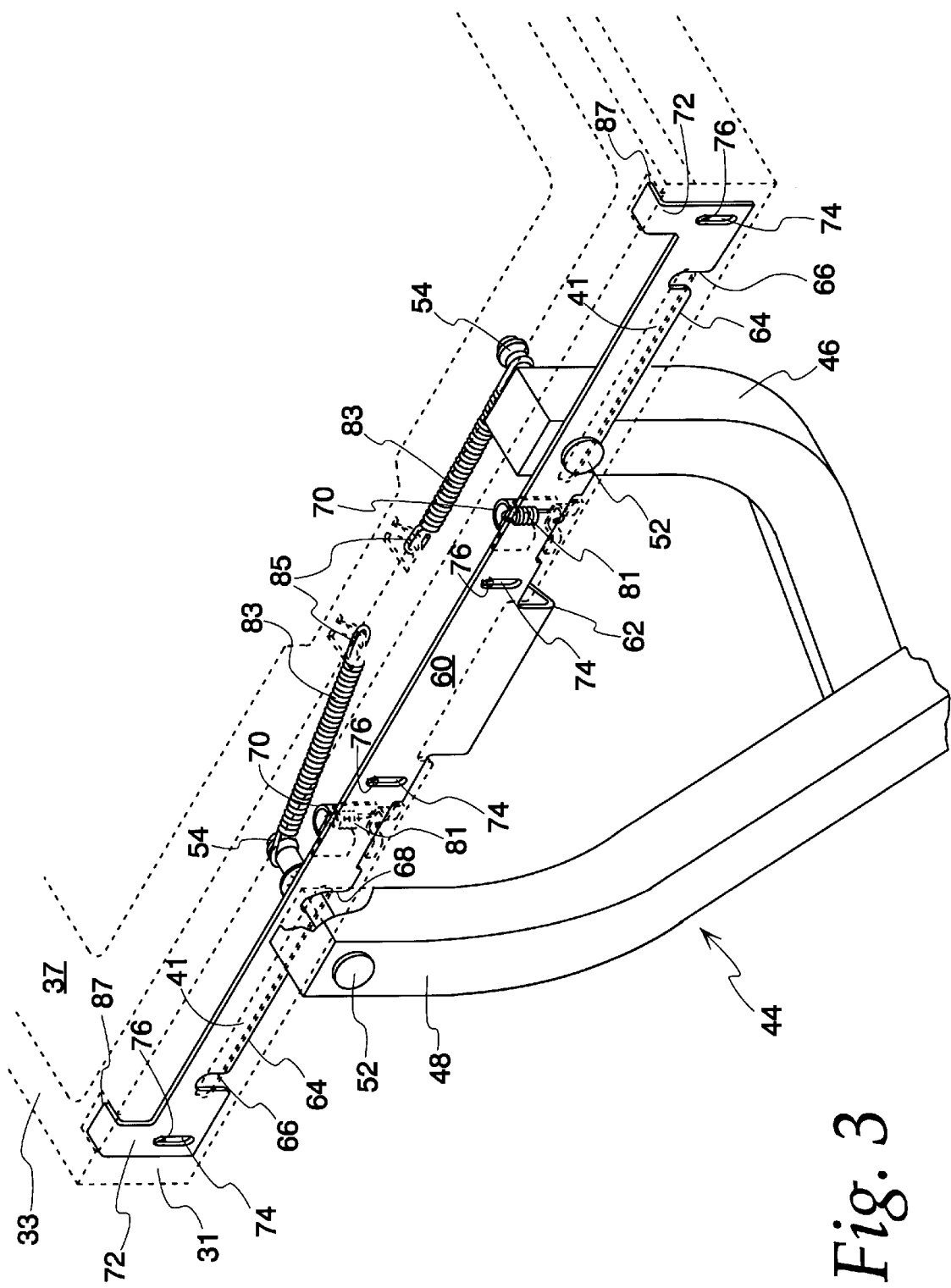
FIG. 3 illustrates an actuator plate and folding leg pair of the present invention where the actuator plate is in the locked positioned folding leg pair is in the open position.

The present invention also includes a first set of extension springs 81 that are connected between the upper support section 27 and the bracket 70. Extension springs 81 are positioned to bias the actuator plate in the locked and lower position, as shown in FIGS. 3 and 5. A second set of extension springs 83 can also be used and are connected between the sliding leg pins 52 and the upper support section 27. As seen, the upper support section includes a hook portion 85 to which one end of the extension springs 83 connect. Extension springs 83 are positioned to bias the legs into an open position when the actuator plate is in the released position, as described below.

FIGS. 3–6 demonstrate the operation of the present invention as the leg mechanism 25 moves from an open position to a closed position. The actuator plate 60 is used to lock the legs 46, 48 in either the open or closed position. When the legs are in the open position, the folding table 12 is used to support the table saw 10. It will be appreciated by those skilled in the art that size and weight of the table saw 10 generally prohibit the folding table 12 having the leg mechanism 25 move between the open and closed position while the table saw is supported on the upper support surface 27.

As seen in FIG. 3, the sliding pins 52 are connected in the curved slot 68 when the legs are in the open position. The curved slot 68 has its given shape so that when the legs 46, 48 are in the open position, the sliding pins 52 cannot be easily removed thereby securing the legs in the open position. As shown, the upper end of the curved slot 68 is directed towards the outer edge to fully position the sliding leg pin 52 into a locked position.

In order to move the legs 46, 48 from the open position to the closed position, the sliding pins 52 are removed from the curved slot. As seen in FIG. 4, the actuator plate 60 is moved from the lower locked position to the upper released position. The handle 62 can be used to move the actuator plate between those positions. As the actuator plate is moved into the released position, the actuator plate extends the first set of springs 81. When the actuator plate 60 is moved into the released position, the folding table surface can be removed from the ground. The freedom of movement provided to the legs 46, 48, together with the movement of the actuator plate 60, removes the sliding leg pins 52 from the upper end of the curved slots 68. With sufficient pressure exerted on the actuator plate, the sliding pins can be removed from the upper end of the curved slots when the folding table surface 12 remains resting on the ground.

As the actuator plate is moved from the locked position to the released position, the shoulder screws 76 move through the lateral guiding slots 74. When the shoulder screws 76 abut against the lower edge of the securing slots, the sliding pins 52 are fully removed from the curved slot 68. The sliding pins 52 are then able to slidably move through the outer slots 41 and pass along the lower indent portion 64 on the actuator plate 60. As the sliding pins move along the outer slots, the legs 46, 48 are moved into the closed position. The legs reach the fully closed position when they reach the end of the indented portion 64, as seen in FIG. 5, which is proximate the end of the outer slot 41. As the legs move through the outer slot 41, the legs 46, 48 exert a force on the second set of extension springs 83.

When the legs reach the end of the indented portion 64, the actuator plate can return to the locked position as the sliding pins move into the straight slots 66 as seen in FIG. 6. As will be appreciated, the first set of extension springs 81 bias the actuator plate into the locked position when pressure is removed from the handle 62. As the springs move the actuator plate from the released position to the locked position, the shoulder screws 76 move from the lower end to the upper end of the lateral guiding slot 74.

Once the legs 46, 48 are in the closed and locked position, the sliding pins 52 can be removed from the straight slots 66 by lifting the handle 62. When the shoulder screws 76 reach the lower end of the securing slot 74, the extension springs 83 bias the legs into the open position. The sliding pins 52 move through the outer slot 41 and along the indented portion 64 until the pins reach the end of the indented portion 64 as seen in FIG. 4. In this position, the sliding pins are inserted the curved slot 68 to secure the leg mechanism 25 into the locked position.

In the preferred embodiment, the present invention includes indicator tabs 72. In this embodiment, the upper support surface 12 includes indicator portions 87 on the upper edge 33 and towards the corners of the surface 12. The indicator portions are indents formed into the upper edge 33. The indicator tabs are designed to fit into the indicator portion so that the upper foot surface of the tabs are flush with the upper edge 33. The combination of the indicator tabs 72 and the indicator portions 87 are used to show when the actuator plate is in the locked or released position. In the locked position, the tabs upper foot surface is flush with the upper edge. In the released position, the tabs 72 protrude above the indicator portions and the upper surface 33. By observing the position of any indicator tab, the position of the corresponding sliding pin can be ascertained. It is known that the table saw 10 can be fully supported by the folding table surface 12 when all the indicator tabs are fully placed in the indicator portions and the leg mechanisms 25 are in the open position. If one indicator tab is above the upper surface, it is then known that the corresponding sliding leg pin is not securely position in either the curved or straight slot.

Although the present invention has been described in considerable detail with reference to certain preferred versions, other versions are possible. Therefore, the spirit and scope of the appended claims should not be limited to the description of the preferred embodiment described.

What is claimed is:

1. A folding table to support a table saw, the folding table comprising:
    a supporting portion having an upper support portion, surface to support the table saw and opposing sides generally perpendicularly to the supporting surface, wherein each side portion has at least one longitudinal slot;
    two leg set pairs each having an upper end and wherein the leg set pair includes two legs connected at a pivot point by pivot pins and each leg is slidably connected to an upper end by sliding pins wherein the sliding pins extend through the longitudinal slots in the supporting portion; and
    an elongated actuator plate for each leg set pair wherein each actuator plate comprises:
        a set of lateral straight slots positioned towards the ends of the actuator plate and extending from a lower longitudinal edge of the actuator plate;
        a set of lateral curved slots positioned towards the center of the actuator plate and extending from the longitudinal edge; and
        wherein the actuator plate is movably connected to the support surface and is movable biased in a locked position to secure the sliding pins in the straight slots or the curved slots and movable to a release position so that the sliding pins move through the longitudinal slot between the straight slot to lock the legs in a closed position and the curved slot to lock the legs in an open position.

2. The folding table according to claim 1 wherein each actuator plate further comprises a comfort-formed handle to move the actuator plate between the locked position and the release position.

3. The folding table according to claim 1 further comprising a first set of extension springs connected between the table and each actuator plate to bias each actuator plate in the locked position.

4. The folding table according to claim 1 further comprising a second set of extension springs connected to the support portion and the legs to bias the legs in the open position.

5. The folding table according to claim 1 wherein the supporting surface further comprises indicator portions and the actuator plate further comprises indicator tabs that fit into the indicator portions when the sliding pins are in the straight slots and the curved slots.

6. The folding table according to claim 1 wherein the supporting surface further has slots through which a portion of the table saw extends to secure the table saw to the folding table.

7. The folding table according to claim 1 wherein the supporting surface has at least one elongated slot on opposing sides.

8. The folding table according to claim 1 wherein the upper portion defines a perimeter edge to reduce the weight of the folding table.

9. A folding table to support a table saw, the folding table comprising:
    a supporting portion having an upper part to hold the table saw and having indicator portions formed in the upper part and opposing side portions extending generally perpendicularly from the supporting surface wherein each side portion has at least one longitudinal slot;
    two leg set pairs wherein each leg has an upper end;
    pins connected to the upper end of each leg and extending through the longitudinal slots in the supporting portion to movably connect the legs to the supporting portion; and
    an elongated actuator plate for each leg set pair wherein the actuator plate comprises:
        a first set of slots positioned towards the ends of the actuator plate and extending from one longitudinal edge;
        a second set of slots positioned towards the center of the actuator plate and extending from the one longitudinal edge;
        wherein the actuator plate is movably connected to the supporting portion between a locked position wherein the leg pins lock the legs in a closed position in the first set of slots or lock the legs in an opened position in the second set of slots and a release position whereby the leg pins move through an elongated slot between the first and second set of slots and wherein the indicator tabs fit into the indicator portions to indicate that the leg pins are in the closed or opened locked position.

10. The folding table according to claim 9 further comprising a first set of extension springs connected between the table and each actuator plate to bias each actuator plate in the locked position.

11. The folding table according to claim 9 further comprising a second set of extension springs connected between the table and the legs to bias the legs into the open position.

12. The folding table according to claim 9 wherein each actuator plate further comprising a comfort-formed handle to move each actuator plate between the locked position and the release position.

13. The folding table according to claim 9 wherein the second set of slots in the actuator plate has a curved end distal the longitudinal edge to secure the leg pins in the open position and so that each pins must be removed from the curved end to move the legs from the open position to the closed position.

14. The folding table according to claim 9 wherein the legs in each leg pair are connected by a pin at a pivot point so that the legs rotate about the pivot point between the open and closed position.

15. The folding table according to claim 9 wherein the upper part defines a perimeter edge to reduce the weight of the folding table.

16. The folding table according to claim 9 wherein the upper part further has slots through which a portion of the table saw extends to secure the table saw.

17. The folding table according to claim 9 wherein the support portion has at least four elongated slots corresponding to each leg.

* * * * *